United States Patent
Ishii

(10) Patent No.: US 8,451,498 B2
(45) Date of Patent: May 28, 2013

(54) IMAGE PROCESSING DEVICE, IMAGE PROCESSING METHOD, TONE-CORRECTION-PARAMETER GENERATION SHEET, AND STORAGE MEDIUM

(75) Inventor: Hiroshi Ishii, Tokyo (JP)

(73) Assignee: Ricoh Company, Limited, Tokyo (JP)

( * ) Notice: Subject to any disclaimer, the term of this patent is extended or adjusted under 35 U.S.C. 154(b) by 749 days.

(21) Appl. No.: 12/618,219

(22) Filed: Nov. 13, 2009

(65) Prior Publication Data

US 2010/0118347 A1    May 13, 2010

(30) Foreign Application Priority Data

Nov. 13, 2008 (JP) ................. 2008-291045

(51) Int. Cl.
*G06K 15/00* (2006.01)
*H04N 1/405* (2006.01)

(52) U.S. Cl.
USPC .............. 358/2.1; 358/3.1; 358/3.14; 358/3.2

(58) Field of Classification Search
None
See application file for complete search history.

(56) References Cited

U.S. PATENT DOCUMENTS

| | | | |
|---|---|---|---|
| 7,586,651 B2 * | 9/2009 | Kurihara | 358/3.23 |
| 2004/0095591 A1 * | 5/2004 | Takahashi | 358/1.9 |
| 2007/0041060 A1 | 2/2007 | Kikuchi et al. | |
| 2009/0317149 A1 * | 12/2009 | Takura | 399/301 |

FOREIGN PATENT DOCUMENTS

| | | |
|---|---|---|
| JP | 09-186900 | 7/1997 |
| JP | 11-98358 | 4/1999 |
| JP | 2004-064358 | 2/2004 |
| JP | 2004-088257 | 3/2004 |
| JP | 2007-59990 | 3/2007 |
| JP | 2007-088920 | 4/2007 |
| JP | 2007-104009 | 4/2007 |
| JP | 2007-264364 | 10/2007 |
| JP | 2007-264371 | 10/2007 |
| JP | 2007-323024 | 12/2007 |

OTHER PUBLICATIONS

Office Action issued on Jun. 6, 2012 in the corresponding Japanese Patent Application No. 2008-291045.

* cited by examiner

*Primary Examiner* — Barbara Reinier
(74) *Attorney, Agent, or Firm* — Oblon, Spivak, McClelland, Maier & Neustadt, L.L.P.

(57) ABSTRACT

An image processing device includes an image output unit, an image input unit, and a tone-correction-parameter generation unit. The image output unit outputs a tone-correction-parameter generation sheet to generate a parameter for correcting a tone of an input image. The tone-correction-parameter generation sheet includes a plurality of patches for at least two types of screens. At least one of the at least two types of screens includes more patches of an identical color and tone than at least another of the at least two types of screens. The image input unit inputs a representative value of each patch read from the tone-correction-parameter generation sheet outputted by the image output unit. The tone-correction-parameter generation unit generates the parameter in accordance with a plurality of representative values inputted by the image input unit.

10 Claims, 13 Drawing Sheets

FIG. 2

← PLACE THIS SHEET ON DOCUMENT GLASS WITH PRINT FACE DOWN. ADJUST PRINTED
ARROW TO REFERENCE POSITION OF DOCUMENT GLASS. ~231

| | | | | | | | | | | | | | | | | |
|---|---|---|---|---|---|---|---|---|---|---|---|---|---|---|---|---|
| K00 | K01 | K02 | K03 | K04 | K05 | K06 | K07 | K08 | K09 | K10 | K11 | K12 | K13 | K14 | K15 | K16 | ~201
| C00 | C01 | C02 | C03 | C04 | C05 | C06 | C07 | C08 | C09 | C10 | C11 | C12 | C13 | C14 | C15 | C16 | ~202
| M00 | M01 | M02 | M03 | M04 | M05 | M06 | M07 | M08 | M09 | M10 | M11 | M12 | M13 | M14 | M15 | M16 | ~203
| Y00 | Y01 | Y02 | Y03 | Y04 | Y05 | Y06 | Y07 | Y08 | Y09 | Y10 | Y11 | Y12 | Y13 | Y14 | Y15 | Y16 | ~204
| M00 | M01 | M02 | M03 | M04 | M05 | M06 | M07 | M08 | M09 | M10 | M11 | M12 | M13 | M14 | M15 | M16 | ~213
| K00 | K01 | K02 | K03 | K04 | K05 | K06 | K07 | K08 | K09 | K10 | K11 | K12 | K13 | K14 | K15 | K16 | ~211
| Y00 | Y01 | Y02 | Y03 | Y04 | Y05 | Y06 | Y07 | Y08 | Y09 | Y10 | Y11 | Y12 | Y13 | Y14 | Y15 | Y16 | ~214
| C00 | C01 | C02 | C03 | C04 | C05 | C06 | C07 | C08 | C09 | C10 | C11 | C12 | C13 | C14 | C15 | C16 | ~212
| Y08 | Y09 | Y10 | Y11 | Y12 | Y13 | Y14 | Y15 | Y16 | Y00 | Y01 | Y02 | Y03 | Y04 | Y05 | Y06 | Y07 | ~224
| M08 | M09 | M10 | M11 | M12 | M13 | M14 | M15 | M16 | M00 | M01 | M02 | M03 | M04 | M05 | M06 | M07 | ~223
| C08 | C09 | C10 | C11 | C12 | C13 | C14 | C15 | C16 | C00 | C01 | C02 | C03 | C04 | C05 | C06 | C07 | ~222
| K08 | K09 | K10 | K11 | K12 | K13 | K14 | K15 | K16 | K00 | K01 | K02 | K03 | K04 | K05 | K06 | K07 | ~221

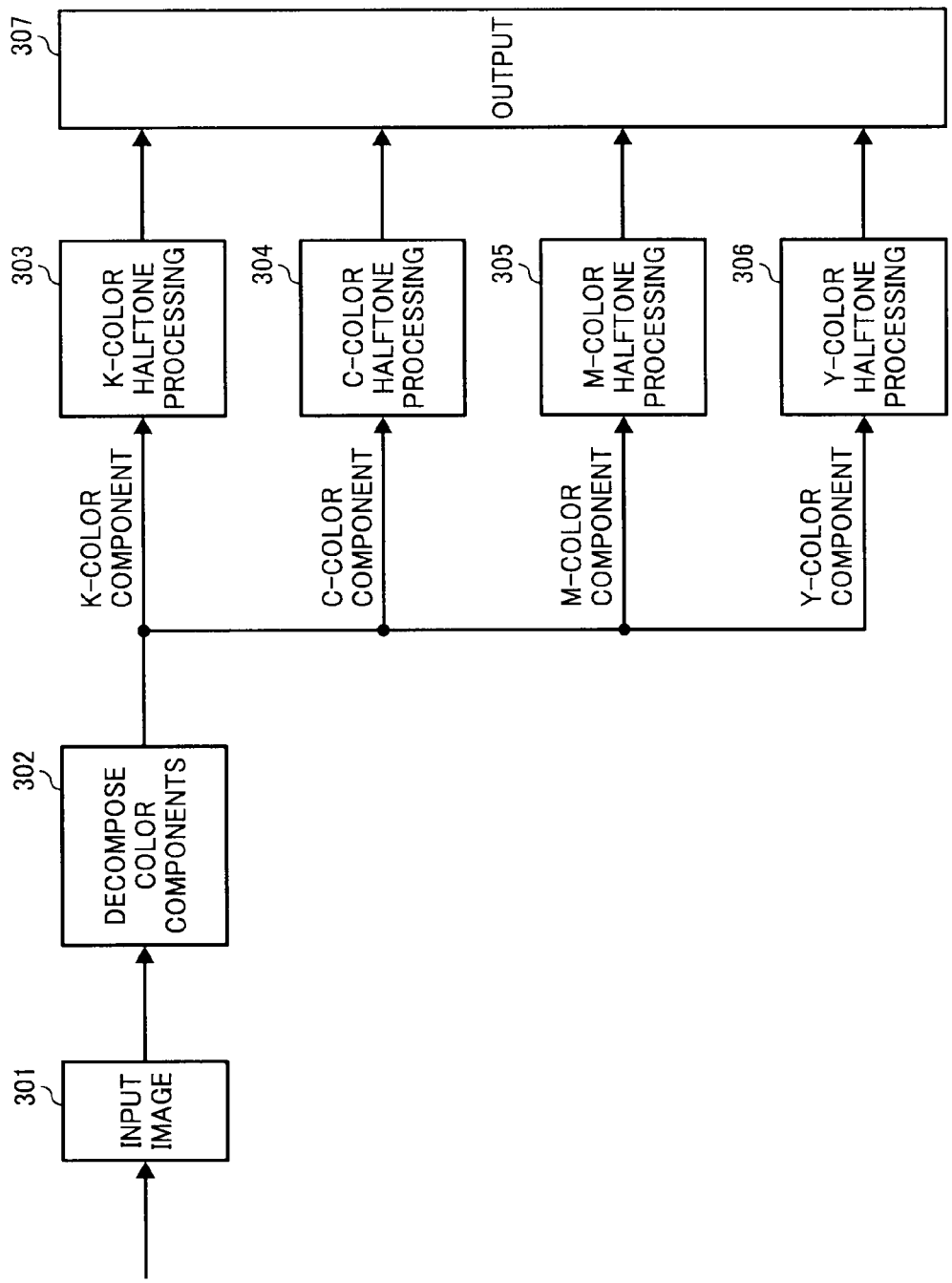

| y\x | 0 | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|---|
| 0 | 64 | 159 | 105 | 137 | 68 | 164 | 103 | 135 | 64 | 160 | 105 | 137 | 68 | 163 | 102 | 134 |
| 1 | 230 | 201 | 10 | 42 | 233 | 198 | 7 | 39 | 230 | 200 | 9 | 41 | 232 | 198 | 6 | 38 |
| 2 | 99 | 131 | 74 | 169 | 97 | 129 | 71 | 167 | 98 | 130 | 73 | 169 | 97 | 129 | 70 | 166 |
| 3 | 3 | 35 | 226 | 193 | 2 | 34 | 225 | 194 | 2 | 34 | 226 | 192 | 1 | 33 | 224 | 194 |
| 4 | 67 | 163 | 101 | 133 | 66 | 161 | 103 | 135 | 66 | 162 | 101 | 133 | 65 | 161 | 104 | 136 |
| 5 | 232 | 197 | 6 | 38 | 229 | 199 | 8 | 40 | 231 | 196 | 5 | 37 | 228 | 200 | 8 | 40 |
| 6 | 96 | 128 | 70 | 165 | 999 | 131 | 72 | 167 | 95 | 127 | 69 | 165 | 100 | 132 | 72 | 168 |
| 7 | 0 | 32 | 224 | 195 | 4 | 36 | 227 | 191 | 0 | 32 | 223 | 196 | 4 | 36 | 228 | 192 |
| 8 | 64 | 160 | 105 | 137 | 68 | 163 | 102 | 134 | 64 | 159 | 105 | 137 | 68 | 164 | 103 | 135 |
| 9 | 230 | 200 | 9 | 41 | 232 | 198 | 6 | 38 | 230 | 201 | 10 | 42 | 233 | 198 | 7 | 39 |
| 10 | 98 | 130 | 73 | 169 | 97 | 129 | 70 | 166 | 99 | 131 | 74 | 169 | 97 | 129 | 71 | 167 |
| 11 | 2 | 34 | 226 | 192 | 1 | 33 | 224 | 194 | 3 | 35 | 226 | 193 | 2 | 34 | 225 | 194 |
| 12 | 66 | 162 | 101 | 133 | 65 | 161 | 104 | 136 | 67 | 163 | 101 | 133 | 66 | 161 | 103 | 135 |
| 13 | 231 | 196 | 5 | 37 | 228 | 200 | 8 | 40 | 232 | 197 | 6 | 38 | 229 | 199 | 8 | 40 |
| 14 | 95 | 127 | 69 | 165 | 100 | 132 | 72 | 168 | 96 | 128 | 70 | 165 | 99 | 131 | 72 | 167 |
| 15 | 0 | 32 | 223 | 196 | 4 | 36 | 228 | 192 | 0 | 32 | 224 | 195 | 4 | 36 | 227 | 191 |

603

| y\x | 0 | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|---|
| 0 | 85 | 180 | 127 | 159 | 89 | 185 | 124 | 156 | 85 | 181 | 126 | 158 | 89 | 184 | 123 | 155 |
| 1 | 251 | 222 | 31 | 63 | 254 | 220 | 28 | 60 | 252 | 222 | 30 | 62 | 254 | 219 | 28 | 60 |
| 2 | 120 | 152 | 95 | 190 | 119 | 151 | 92 | 188 | 119 | 151 | 94 | 190 | 118 | 150 | 91 | 187 |
| 3 | 24 | 56 | 248 | 214 | 23 | 55 | 246 | 215 | 24 | 56 | 247 | 214 | 22 | 54 | 246 | 216 |
| 4 | 88 | 184 | 123 | 155 | 87 | 182 | 125 | 157 | 87 | 183 | 122 | 154 | 86 | 182 | 125 | 157 |
| 5 | 253 | 218 | 27 | 59 | 250 | 220 | 29 | 61 | 252 | 218 | 26 | 58 | 250 | 221 | 30 | 62 |
| 6 | 117 | 149 | 91 | 186 | 121 | 153 | 93 | 188 | 117 | 149 | 90 | 186 | 121 | 153 | 93 | 189 |
| 7 | 22 | 54 | 245 | 216 | 25 | 57 | 248 | 212 | 21 | 53 | 244 | 217 | 26 | 58 | 249 | 213 |
| 8 | 85 | 181 | 126 | 158 | 89 | 184 | 123 | 155 | 85 | 180 | 127 | 159 | 89 | 185 | 124 | 156 |
| 9 | 252 | 222 | 30 | 62 | 254 | 219 | 28 | 60 | 251 | 222 | 31 | 63 | 254 | 220 | 28 | 60 |
| 10 | 119 | 151 | 94 | 190 | 118 | 150 | 91 | 187 | 120 | 152 | 95 | 190 | 119 | 151 | 92 | 188 |
| 11 | 24 | 56 | 247 | 214 | 22 | 54 | 246 | 216 | 24 | 56 | 248 | 214 | 23 | 55 | 246 | 215 |
| 12 | 87 | 183 | 122 | 154 | 86 | 182 | 125 | 157 | 88 | 184 | 123 | 155 | 87 | 182 | 125 | 157 |
| 13 | 252 | 218 | 26 | 58 | 250 | 221 | 30 | 62 | 253 | 218 | 27 | 59 | 250 | 220 | 29 | 61 |
| 14 | 117 | 149 | 90 | 186 | 121 | 153 | 93 | 189 | 117 | 149 | 91 | 186 | 121 | 153 | 93 | 188 |
| 15 | 21 | 53 | 244 | 217 | 26 | 58 | 249 | 213 | 22 | 54 | 245 | 216 | 25 | 57 | 248 | 212 |

| y\x | 0 | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|---|
| 0 | 74 | 170 | 116 | 148 | 79 | 174 | 113 | 145 | 75 | 170 | 115 | 147 | 78 | 174 | 113 | 145 |
| 1 | 240 | 212 | 20 | 52 | 244 | 209 | 18 | 50 | 241 | 211 | 20 | 52 | 243 | 208 | 17 | 49 |
| 2 | 109 | 141 | 84 | 180 | 108 | 140 | 82 | 177 | 109 | 141 | 84 | 179 | 107 | 139 | 81 | 176 |
| 3 | 14 | 46 | 237 | 204 | 12 | 44 | 236 | 204 | 13 | 45 | 236 | 203 | 12 | 44 | 235 | 205 |
| 4 | 78 | 173 | 112 | 144 | 76 | 172 | 114 | 146 | 77 | 172 | 111 | 143 | 76 | 171 | 115 | 147 |
| 5 | 242 | 208 | 16 | 48 | 240 | 210 | 18 | 50 | 242 | 207 | 16 | 48 | 239 | 210 | 19 | 51 |
| 6 | 107 | 139 | 80 | 176 | 110 | 142 | 82 | 178 | 106 | 138 | 80 | 175 | 111 | 143 | 83 | 178 |
| 7 | 11 | 43 | 234 | 206 | 14 | 46 | 238 | 202 | 10 | 42 | 234 | 206 | 15 | 47 | 238 | 202 |
| 8 | 75 | 170 | 115 | 147 | 78 | 174 | 113 | 145 | 74 | 170 | 116 | 148 | 79 | 174 | 113 | 145 |
| 9 | 241 | 211 | 20 | 52 | 243 | 208 | 17 | 49 | 240 | 212 | 20 | 52 | 244 | 209 | 18 | 50 |
| 10 | 109 | 141 | 84 | 179 | 107 | 139 | 81 | 176 | 109 | 141 | 84 | 180 | 108 | 140 | 82 | 177 |
| 11 | 13 | 45 | 236 | 203 | 12 | 44 | 235 | 205 | 14 | 46 | 237 | 204 | 12 | 44 | 236 | 204 |
| 12 | 77 | 172 | 111 | 143 | 76 | 171 | 115 | 147 | 78 | 173 | 112 | 144 | 76 | 172 | 114 | 146 |
| 13 | 242 | 207 | 16 | 48 | 239 | 210 | 19 | 51 | 242 | 208 | 16 | 48 | 240 | 210 | 18 | 50 |
| 14 | 106 | 138 | 80 | 175 | 111 | 143 | 83 | 178 | 107 | 139 | 80 | 176 | 110 | 142 | 82 | 178 |
| 15 | 10 | 42 | 234 | 206 | 15 | 47 | 238 | 202 | 11 | 43 | 234 | 206 | 14 | 46 | 238 | 202 |

| PATCH CODE | TONE VALUE |
|---|---|
| K00 | 0 |
| K01 | 16 |
| K02 | 32 |
| K03 | 48 |
| K04 | 64 |
| K05 | 80 |
| K06 | 96 |
| K07 | 112 |
| K08 | 128 |
| K09 | 143 |
| K10 | 159 |
| K11 | 175 |
| K12 | 191 |
| K13 | 207 |
| K14 | 223 |
| K15 | 239 |
| K16 | 255 |

FIG. 9

| PATCH CODE | TONE VALUE | ACTUAL READOUT AVERAGE |
|---|---|---|
| K00 | 0 | 250 |
| K01 | 16 | 207 |
| K02 | 32 | 191 |
| K03 | 48 | 166 |
| K04 | 64 | 141 |
| K05 | 80 | 109 |
| K06 | 96 | 100 |
| K07 | 112 | 88 |
| K08 | 128 | 75 |
| K09 | 143 | 64 |
| K10 | 159 | 51 |
| K11 | 175 | 45 |
| K12 | 191 | 32 |
| K13 | 207 | 29 |
| K14 | 223 | 24 |
| K15 | 239 | 21 |
| K16 | 255 | 20 |

FIG. 10

| TONE VALUE | TARGET READOUT AVERAGE |
|---|---|
| 0 | 250 |
| 17 | 225 |
| 34 | 200 |
| 51 | 175 |
| 68 | 150 |
| 85 | 130 |
| 102 | 110 |
| 119 | 90 |
| 136 | 75 |
| 153 | 60 |
| 170 | 50 |
| 187 | 42 |
| 204 | 35 |
| 221 | 30 |
| 238 | 24 |
| 255 | 20 |

FIG. 17

| -1 | -1 | 0 | 1 | 1 |
|---|---|---|---|---|
| -1 | -1 | 0 | 1 | 1 |
| -1 | -1 | 0 | 1 | 1 |
| -1 | -1 | 0 | 1 | 1 |
| -1 | -1 | 0 | 1 | 1 |

1701

| -1 | -1 | -1 | -1 | -1 |
|---|---|---|---|---|
| -1 | -1 | -1 | -1 | -1 |
| 0 | 0 | 0 | 0 | 0 |
| 1 | 1 | 1 | 1 | 1 |
| 1 | 1 | 1 | 1 | 1 |

1702

| -1 | -1 | -1 | -1 | 0 |
|---|---|---|---|---|
| -1 | -1 | -1 | 0 | 1 |
| -1 | -1 | 0 | 1 | 1 |
| -1 | 0 | 1 | 1 | 1 |
| 0 | 1 | 1 | 1 | 1 |

1703

| 0 | 1 | 1 | 1 | 1 |
|---|---|---|---|---|
| -1 | 0 | 1 | 1 | 1 |
| -1 | -1 | 0 | 1 | 1 |
| -1 | -1 | -1 | 0 | 1 |
| -1 | -1 | -1 | -1 | 0 |

1704

IMAGE PROCESSING DEVICE, IMAGE PROCESSING METHOD, TONE-CORRECTION-PARAMETER GENERATION SHEET, AND STORAGE MEDIUM

CROSS-REFERENCE TO RELATED APPLICATIONS

The present patent application claims priority pursuant to 35 U.S.C. §119 from Japanese Patent Application No. 2008-291045, filed on Nov. 13, 2008 in the Japan Patent Office, which is incorporated herein by reference in its entirety.

BACKGROUND OF THE INVENTION

1. Field of the Invention

Illustrative embodiments of the present invention relate to a parameter generation sheet for generating a parameter to correct image tone in a digital copier, a facsimile machine, a printer, or any other type of apparatus capable of forming a gradation image, an image processing device using the sheet, an image processing method using the sheet, and a storage medium storing program codes causing a computer to execute the method using the sheet.

2. Description of the Background

Image output apparatuses are used as printers, facsimile machines, copiers, plotters, or multi-functional peripherals having two or more of the foregoing capabilities. When such an image output apparatus outputs images using the same image data over time, the output images may come to have different image densities. To correct such variation in image density over time, a set of test patches may be output from the image output apparatus and read with, e.g., a scanner to generate parameters to correct image tone.

However, even if images are output using the same image data, the output images have different densities at different areas. In a conventional electrophotographic-type image output apparatus, such variation in image density may be attributable, for example, to problems in the quality or assembly accuracy of components, such as eccentricity in the rotation of a photoconductor or a transfer roller or variation in a gap between the photoconductor and a development sleeve in a direction along a rotation shaft of the photoconductor.

Hence, certain conventional image forming apparatuses have been proposed that form a plurality of test patches having an identical density (tone) value, determine the densities of the patches, and calculate an average of the densities to generate density-correction parameters to correct variation in image density over time while correcting localized differences in image density.

One conventional printer uses different types of screens depending on the type of target object. For example, a lower LPI (lines-per-inch) screen is used for picture-and-pattern objects. By contrast, a higher LPI screen or a substantially-random screen through error diffusion processing is used for character or line objects.

Alternatively, each target area of a document may be identified as an edge portion or a non-edge portion, with a lower LPI screen used for the non-edge portion and a higher LPI screen or a substantially-random screen through error diffusion processing used for character or line portions.

In other words, the lower LPI screen capable of stably expressing image gradation is used for a picture-and-pattern portion or a non-edge portion in which tone expression is relatively important, and the higher LPI screen capable of more accurately expressing details is used for a character or line object in which resolution and sharpness are relatively more important than gradation. In this regard, since different types of screens may have different relations between tone values and densities, it may be preferable to output tone correction patches for each screen type to generate tone correction parameters.

As described above, in generating tone correction parameters, one conventional technique outputs a plurality of test patches of an identical color and tone in a parameter generation sheet to generate tone correction parameters, and calculates an average of detected densities of the patches to correct localized differences in image density. However, outputting a plurality of patches for each screen type increases the number of output patches, circuit size, calculation time, consumed amounts of toner, ink, and other consumables. Further, such an increased number of patches necessitates an increased print area, resulting in an increased number of print pages.

SUMMARY OF THE INVENTION

In one illustrative embodiment, an image processing device includes an image output unit, an image input unit, and a tone-correction-parameter generation unit. The image output unit outputs a tone-correction-parameter generation sheet to generate a parameter for correcting a tone of an input image. The tone-correction-parameter generation sheet includes a plurality of patches for at least two types of screens. At least one of the at least two types of screens includes more patches of an identical color and tone than at least another of the at least two types of screens. The image input unit inputs a representative value of each patch read from the tone-correction-parameter generation sheet outputted by the image output unit. The tone-correction-parameter generation unit generates the parameter in accordance with a plurality of representative values inputted by the image input unit.

In another illustrative embodiment, a tone-correction-parameter generation sheet for generating a parameter to correct a tone of an input image includes a plurality of patches for at least two types of screens. At least one of the at least two types of screens includes more patches of an identical color and tone than at least another of the at least two types of screens.

In still another illustrative embodiment, an image processing method includes outputting a tone-correction-parameter generation sheet to generate a parameter for correcting a tone of an input image, the tone-correction-parameter generation sheet comprising a plurality of patches for at least two types of screens, at least one of the at least two types of screens including more patches of an identical color and tone than at least another of the at least two types of screens; inputting a representative value of each patch read from the tone-correction-parameter generation sheet outputted by the outputting; and generating the parameter in accordance with a plurality of representative values inputted by the inputting.

In further still another illustrative embodiment, a computer-readable storage medium storing program codes causing a computer to execute the above-mentioned image processing method.

BRIEF DESCRIPTION OF THE DRAWINGS

A more complete appreciation of the disclosure and many of the attendant advantages thereof will be readily acquired as the same becomes better understood by reference to the following detailed description when considered in connection with the accompanying drawings, wherein:

FIG. 2 is an illustration of an example of a parameter generation sheet with which tone correction parameters are generated;

FIG. 3 is a diagram illustrating an example of a configuration of a parameter-generation-sheet output unit;

FIG. 5 shows an example of threshold matrices for lower-lines-per-inch screen processing;

FIG. 6 shows an example of threshold matrices for higher-lines-per-inch screen processing;

FIG. 9 is a diagram illustrating an example of a table containing actual readout values;

FIG. 10 shows an example of relations between target tone values and readout values;

FIG. 17 shows an example of primary differentiation filters.

Figure 1:
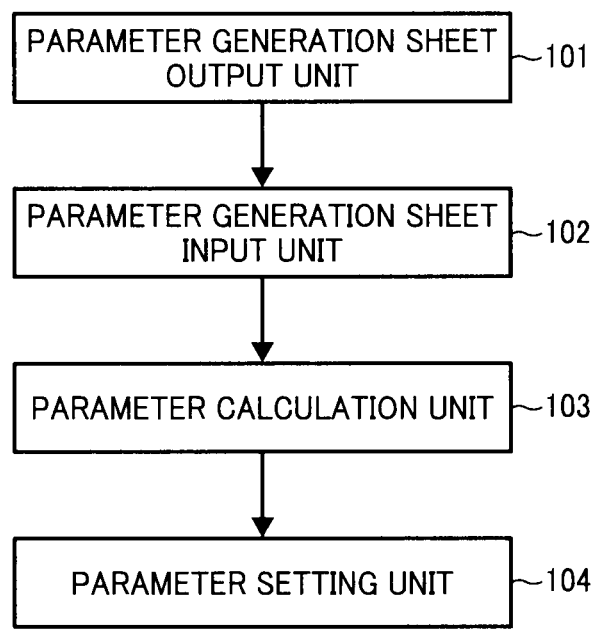
FIG. 1 is a diagram illustrating an example of a configuration of an image processing device to generate tone correction parameters.

The accompanying drawings are intended to depict illustrative embodiments of the present disclosure and should not be interpreted to limit the scope thereof. The accompanying drawings are not to be considered as drawn to scale unless explicitly noted.

DETAILED DESCRIPTION OF ILLUSTRATIVE EMBODIMENTS

In describing embodiments illustrated in the drawings, specific terminology is employed for the sake of clarity. However, the disclosure of this patent specification is not intended to be limited to the specific terminology so selected and it is to be understood that each specific element includes all technical equivalents that operate in a similar manner and achieve similar results.

Although the illustrative embodiments are described with technical limitations with reference to the attached drawings, such description is not intended to limit the scope of the present invention and all of the components or elements described in the illustrative embodiments of this disclosure are not necessarily indispensable to the present invention.

Below, illustrative embodiments according to the present disclosure are described with reference to attached drawings.

Illustrative Embodiment 1

FIG. 1 is a diagram illustrating an example of a configuration of an image processing device that generates parameters to correct image tone. In FIG. 1, the image processing device includes a parameter-generation-sheet output unit 101, a parameter-generation-sheet input unit 102, a tone-correction-parameter calculation unit 103, and a tone-correction-parameter setting unit 104. Below, the value of image tone, that is, image data is represented by an integer within a range from 0 to 255. The greater the tone value, the density is higher. By contrast, for scan data, that is, a readout value of a scanner, the smaller the readout value, the density is higher.

The parameter-generation-sheet output unit 101 inputs image data to generate tone correction parameters, and performs processing with a lower-LPI (lines per inch) screen (hereinafter, referred to as "lower-LPI screen processing") on respective patch strings of a picture-and-pattern section "K" 201, a picture-and-pattern section "C" 202, a picture-and-pattern section "M" 203, a picture-and-pattern section "Y" 204, a picture-and-pattern section "K" 221, a picture-and-pattern section "C" 222, a picture-and-pattern section "M" 223, and a picture-and-pattern section "Y" 224. By contrast, the parameter-generation-sheet output unit 101 performs processing with a higher-LPI screen (hereinafter, referred to as "higher-LPI screen processing") on a caption 231 and respective patch strings of a character section "K" 211, a character section "C" 212, a character section "M" 213, and a character section "Y" 214. Then, the parameter-generation-sheet output unit 101 prints a parameter generation sheet illustrated in FIG. 2 on a sheet of paper.

FIG. 3 is a diagram illustrating a configuration of the parameter-generation-sheet output unit 101 to perform lower- or higher-LPI screen processing on the input image data. Image data inputted from an image input unit 301 is decomposed into color components, e.g., cyan (C), magenta (M), yellow (Y), and black (K) in a color-component decomposition unit 302. Halftone processing units 303 to 306 perform halftone processing on the decomposed color components to determine output tone values in accordance with the relations between tone values of respective pixels of each color and corresponding thresholds, and an output unit 307 outputs the determined tone values.

Here, a description is given of halftone processing for black (K). Halftone processing is performed on other colors in the same manner except different thresholds are used. Alternatively, the identical sets of thresholds may be used for different color components.

Figure 4:
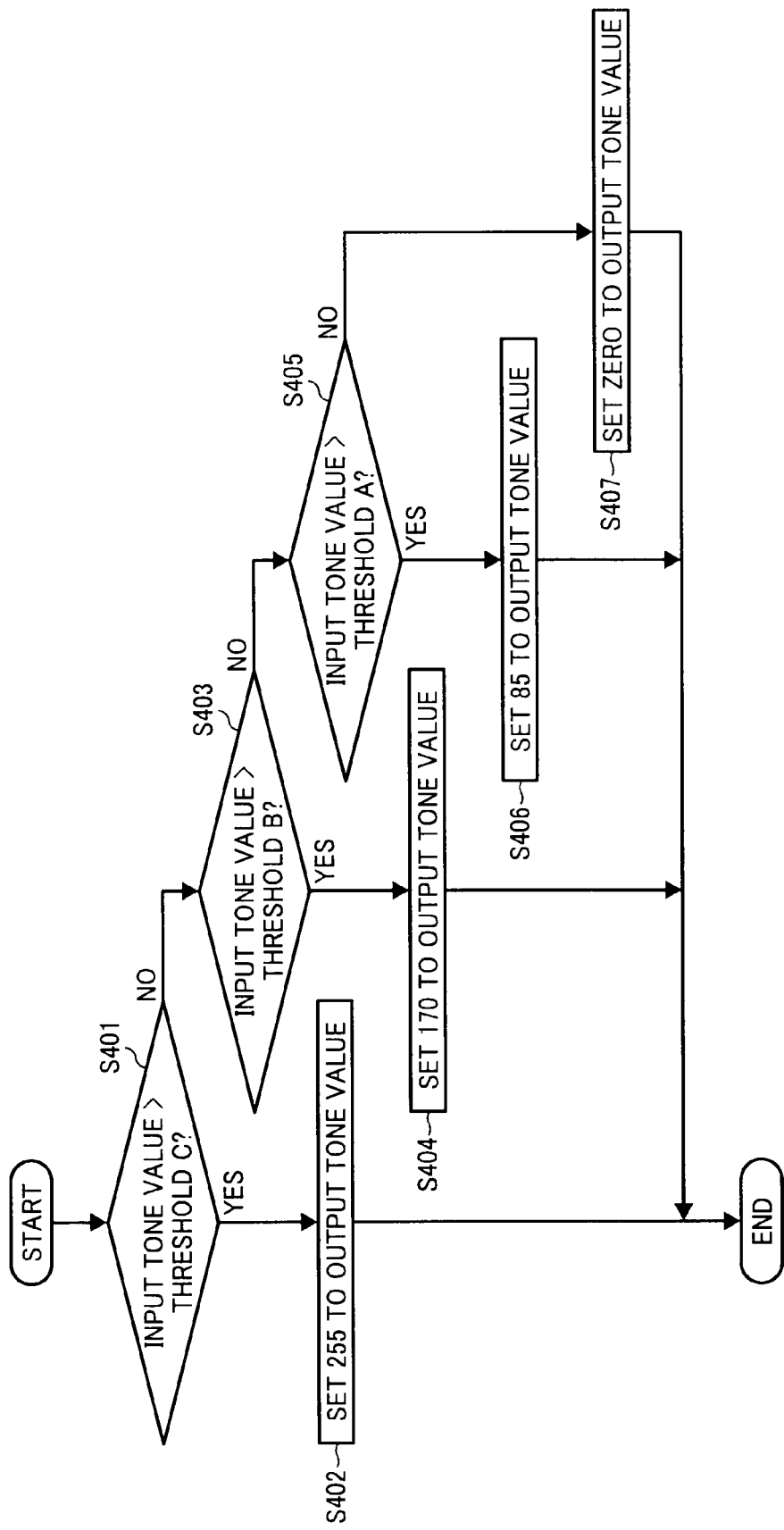
FIG. 4 is a flowchart illustrating an example of halftone processing of black color.

FIG. 4 is a flowchart illustrating processing performed by the black halftone processing unit 303 to determine an output tone value from among zero, 85, 170, and 255 by using a K-component value of a processing target pixel as an input tone value.

If the input tone value is greater than a threshold "C" ("YES" at S401), 255 is set to the output tone value at S402. By contrast, if the input tone value is not greater than the threshold "C" ("NO" at S401), at S403 the input tone value is compared with a threshold "B". If the input tone value is greater than the threshold "B" ("YES" at S403), 170 is set to the output tone value at S404.

If the input tone value is not greater than the threshold "B" ("NO" at S403), at S405 the input tone value is compared with a threshold "A". If the input tone value is greater than the threshold "A" ("YES" at S405), 85 is set to the output tone value at S406. If the input tone value is not greater than the threshold "A" ("NO" at S405), zero is set to the output tone value at S407.

For example, when the input tone value is 237 at a pixel position having the thresholds "A", "B", and "C" of 231, 235, and 240, respectively, 170 is set to the output tone value.

Figure 5:
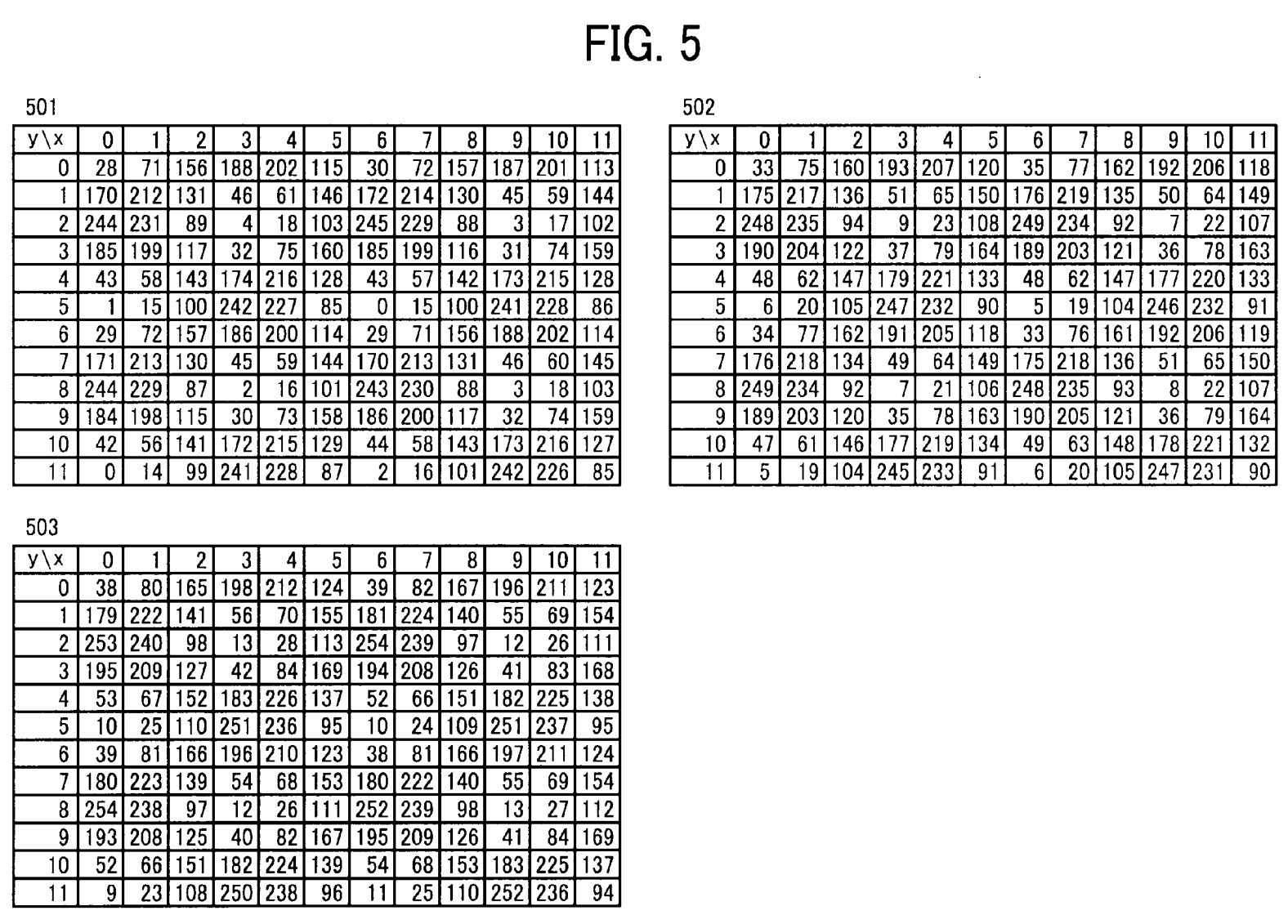

In the lower-LPI screen processing, for example, the black halftone processing unit 303 determines a threshold in accordance with a threshold matrix illustrated in FIG. 5 to create a halftone dot screen having 141 lines and 45 degrees at the 600-dpi output for color, and compares an input tone value with the threshold to determine an output tone value.

The present example assumes that any one of zero, 85, 170, 255 is set to the output tone value. Further, the threshold "A" is a threshold for determining whether the threshold matrix 501 illustrated in FIG. 5 outputs a dot corresponding to the output tone value 85, the threshold "B" is a threshold for determining whether a threshold matrix 502 illustrated in FIG. 5 outputs a dot corresponding to the output tone value 170, and the threshold "C" is a threshold for determining whether a threshold matrix 503 illustrated in FIG. 5 outputs a dot corresponding to the output tone value 255.

First, a description is given of a method of determining a threshold using a threshold matrix. The position of a target pixel is determined based on a position of the target pixel on a threshold matrix defined when the threshold matrix is repeatedly arranged in a tile-like pattern on an output image.

For example, when the threshold matrix has a "w" pixel width and a "h" pixel length and the target pixel has a coordinate (X, Y) on the output image, the threshold of a position of (X mod w) on the horizontal axis and (Y mod h) on the vertical axis in the threshold matrix coordinate is used for the target pixel. The term "mod" indicates remainder operator, and (X mod w) represents a remainder obtained by dividing "X" by "w". For example, since w=h=12 is obtained from the threshold matrix illustrated in FIG. 5, for the pixel having a coordinate (X, Y)=(13, 26) on the output image, a threshold of the position of (x, y)=(1, 2) is used. In such a case, the thresholds "A", "B", and "C" are determined to be 231, 235, and 240, respectively, in accordance with the corresponding positions of the threshold matrices 501, 502, and 503.

In the higher-LPI screen processing, for example, the black halftone processing unit 303 determines a threshold in accordance with a threshold matrix illustrated in FIG. 6 instead of the threshold matrix illustrated in FIG. 5 to create a halftone dot screen having 212 lines and 45 degrees at the 600-dpi output for color, and compares an input tone value with the threshold to determine an output tone value.

Here, a description is given of the parameter-generation sheet illustrated in FIG. 2. In FIG. 2, K, C, M, and Y represent black, cyan, magenta, and yellow, respectively. Each patch string consists of patches having any one color component of K, C, M, and Y.

Figures 7, 8:
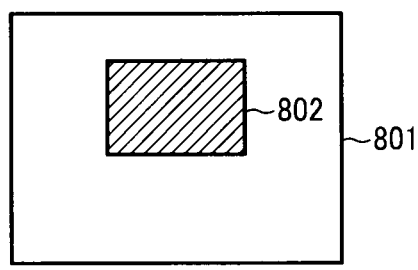
FIG. 7 is a diagram illustrating an example of a table containing black tone values of patches.
FIG. 8 is an illustration used to explain a method of determining a readout value of a patch.

For example, each of the patch strings of the picture-and-pattern section "K" 201, the character section "K" 211, and the picture-and-pattern section "K" 221 includes patches K00 to K16. In FIG. 7, the tone values of the patches substantially evenly increase from zero of K00 to 255 of K16. Alternatively, it is to be noted that the tone values of K00 to K16 may be unevenly distributed.

For example, if the tone value of the picture-and-pattern section "K" 201 is identical to that of the picture-and-pattern section "K" 221, the tone value of K12 of the picture-and-pattern section "K" 201 or the picture-and-pattern section "K" 221 may differ from the tone value of K12 of the character section "K" 211. Further, all of the C, M, and Y tone values of the picture-and-pattern sections "K" 201 and the picture-and-pattern section "K" 221 are set to be zero. Likewise, for example, each of the patch strings of the picture-and-pattern section "C" 202, the character section "C" 212, and the picture-and-pattern section "C" 222 includes the patches C00 to C16. The tone values of C of the patches are set so as to substantially evenly increase from zero of C00 to 255 of C16, and all the tone values of K, M, and Y are set to be zero.

It is to be noted that the parameter generation sheet illustrated in FIG. 2 is not limited to a sheet directly outputted with the above-described designated tone values and may be a sheet outputted through tone correction using tone correction parameters previously generated by the image processing device.

The parameter-generation-sheet input unit 102 reads the above-mentioned parameter generation sheet placed on the scanner by a user and determines a readout value of each patch.

One example of the method of determining such a readout value of each patch is described with reference to FIG. 8. When the parameter generation sheet is read by the scanner, the readout value of each patch is determined as follows.

For K and Y patches, the average of green channel data of the scanner at 128×96 pixels within a target patch is obtained as a readout value of the target patch. For M patches, the average of blue channel data of the scanner at 128×96 pixels within a target patch is obtained as a readout value of the target patch. In this example, the color channel of the scanner is selected for each patch color so that the channel data vary in a relatively wide range.

As illustrated in FIG. 8, for one patch 801, the average value of particular-channel data read with the scanner in a target area 802 is determined as the readout value.

Next, the tone-correction-parameter calculation unit 103 determines a tone correction parameter. Below, a method of determining the tone correction parameter is described with reference to FIGS. 9 and 10.

In the picture-and-pattern sections, patches of an identical color and tone value are output at two positions. For example, both the patch K08 of the picture-and-pattern section "K" 201 and the patch K08 of the picture-and-pattern section "K" 221 have a black toner value of 128 as shown in FIG. 7. The readout values of the respective patches are determined at the parameter-generation-sheet input unit 102. An average of the readout value of K08 of the picture-and-pattern section "K" 201 and the readout value of K08 of the picture-and-pattern section "K" 221 is determined as the readout value of the black tone value of 128. For example, if the readout values of K08 patches of the picture-and-pattern sections "K" 201 and 221 are 80 and 70, respectively, the average value 75 of 70 and 80 is determined as the readout value of the black tone value of 128. Thus, the readout values illustrated in FIG. 9 are obtained. Likewise, even when the tone-correction-parameter generation sheet includes three or more patches having an identical color and tone value for one type of screen, the average of readout values is obtained in a similar manner.

On the contrary, for character sections, a patch of an identical color and tone value is output at only one position. Accordingly, a readout value of the patch is directly used. The γ correction table containing tone correction parameters is created so as to satisfy relations between predetermined target tone values and readout values of the patches.

FIG. 10 shows an example of the relations between target tone values (i.e., designed ideal tone values) and readout values. Thus, for example, when an instruction is sent to the image processing device to output a patch having a tone value of 136, the γ correction table is created to perform tone correction for adjusting the density of the patch so that the readout value of the patch by the scanner is 75.

As illustrated in FIG. 10, the target readout value for the tone value of 136 is 75. As illustrated in FIG. 9, when the readout value of the patch having the black tone value of 128 is 75, the γ correction table is created so as to output a tone value of 128 on input of the tone value of 136 (see FIG. 11).

Thus, data on the black tone value of 136 is converted to the tone value of 128 through tone correction for output. As described above, when the patch outputted at the black tone value of 128 is scanned, the readout value is 75. Accordingly, performing tone correction according to the γ correction table created for the tone value of 136 allows outputting in accordance with the target tone value.

As illustrated in FIG. 10, when the target readout value of 30 is set for the tone value of 221, there is no patch having the readout value of 30 in the table illustrated in FIG. 9. In such a case, a tone value corresponding to the readout value of 30 is determined by linear interpolation.

In FIG. 9, the readout value of K12 patch of the picture-and-pattern section, i.e., the patch having a black tone value of 191 is 32, and the readout value of K13 patch of the picture-and-pattern section, i.e., the patch having a black tone value of 207 is 29. Accordingly, the tone value corresponding to the readout value of 30 is determined to be 202 (see FIG. 12).

Figure 11:
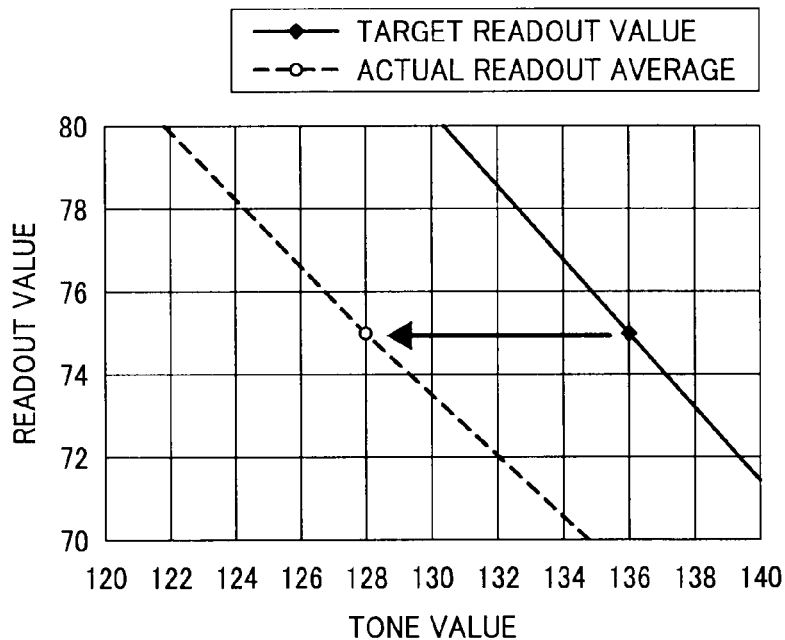
FIG. 11 shows an example of a γ correction table.
Figure 12:
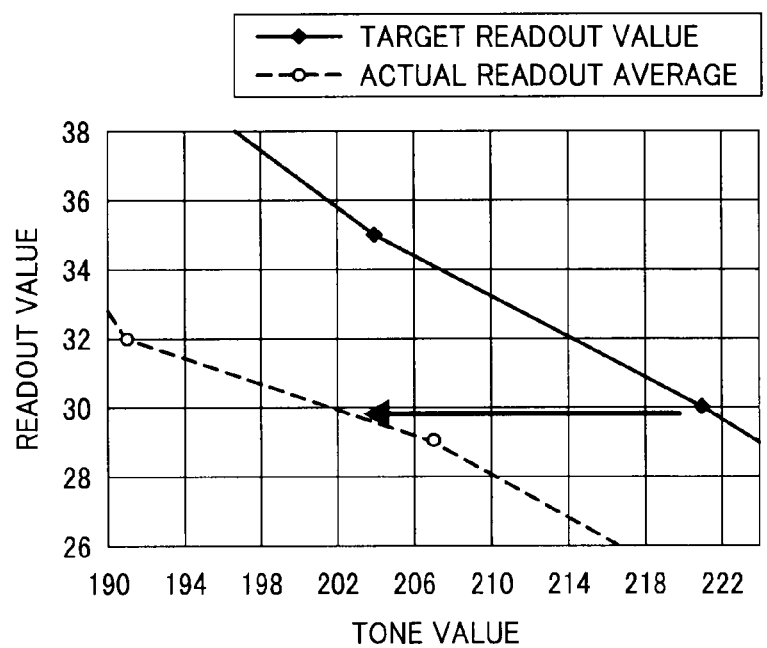
FIG. 12 shows another example of the γ correction table.

As described above, the conversion table as illustrated in FIGS. 11 and 12 regarding the discrete 16 tone values illustrated in FIG. 10 is created to have the (output) tone values on the horizontal axis and the 16 (input) tone values illustrated in FIG. 10 on the vertical axis. Then, the 16 tone values are smoothly corrected using, for example, spline interpolation while preventing inversion as needed, thus creating the γ correction table for 256 tone values from zero to 255.

In the present illustrative embodiment, the configuration in which output patches are read with the scanner is described. However, it is to be noted that the output patches may be read with a colorimeter such as a densitometer or a illuminometer. In such a case, the γ correction table is created with target values determined by the relations between tone values and measured density or brightness values instead of the relations between tone values and the readout values of the scanner illustrated in FIG. 10.

Next, the tone-correction-parameter setting unit 104 sets the printer to perform tone processing with the above-described tone correction parameters.

Figure 13:
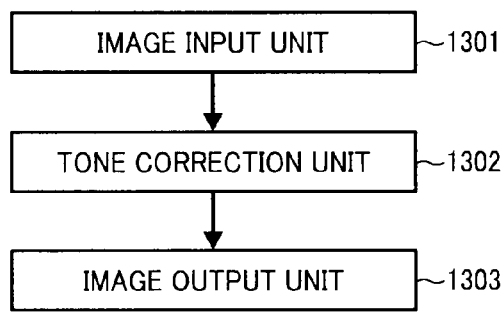
FIG. 13 is a diagram illustrating a configuration in which tone correction is performed with tone correction parameters.

FIG. 13 is a diagram illustrating a configuration of performing tone correction with the tone correction parameters created in the above-described manner. An image input unit 1301 inputs an image by one pixel. The image data has an integer value in a range from zero to 255 for each pixel. In accordance with the tone correction parameters, a tone correction unit 1302 converts the integral values of the image inputted from the image input unit 1301 to a tone value by one pixel. An image output unit 1303 outputs the tone value converted with the tone correction unit 1302 by one pixel.

Thus, the configuration according to the present illustrative embodiment allows creating high-resolution tone correction parameters for a screen used for an area in which tone property is relatively important and cost-and-speed-prioritized tone correction parameters for a screen used for an area in which tone property is not so important.

Illustrative Embodiment 2

Figure 14:
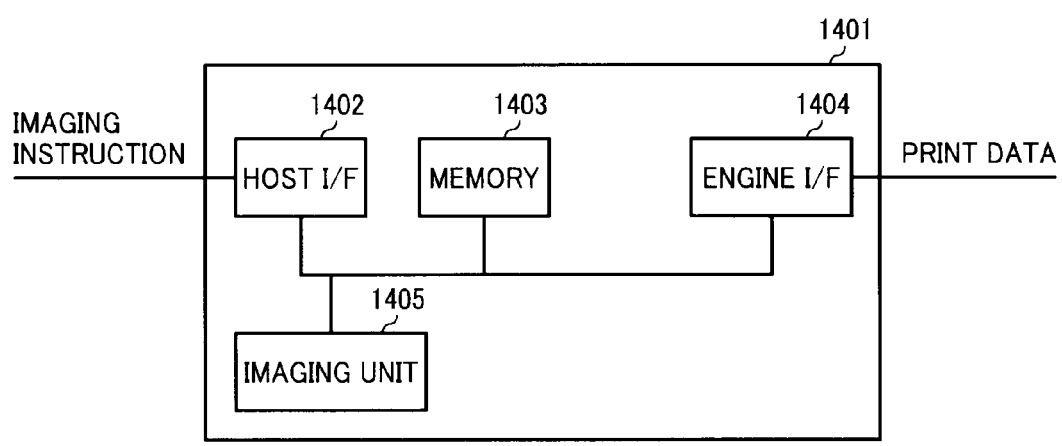
FIG. 14 is a diagram illustrating a configuration example of printing capability.

Next, an example of a configuration of printing capability using tone correction parameters generated in the above-described manner is described with reference to FIG. 14. An image processing device 1401 according to another illustrative embodiment of the present disclosure receives imaging instructions from a host computer, not illustrated, via a host I/F 1402 and writes the instruction to a memory 1403. An imaging unit 1405 serially interprets the imaging instructions written in the memory 1403, and creates bitmap data so as to be transmittable to a print engine. After completing interpretation of the imaging instructions corresponding to one page, the imaging unit 1405 outputs the bitmap data as print data to the print engine via an engine I/F.

The imaging instructions are, for example, instructions for imaging image, character, graphic (e.g., line drawing), and/or other objects. According to the needs, screen processing associated with a target object of each imaging instruction and γ conversion processing associated with the screen processing are performed. Specifically, for the instruction for imaging image object, processing for forming a lower-LPI screen and γ conversion processing using a γ conversion table for lower-LPI-screen processing are performed. For the instruction for imaging character object or graphic object, processing for forming a higher-LPI screen and γ conversion processing using a γ conversion table for higher-LPI-screen processing are performed. Such γ conversion tables associated with the types of objects and screen processing are created in the same manner as described in the above-described illustrative embodiment.

Thus, the configuration according to the present illustrative embodiment allows creating high-resolution tone correction parameters for a screen used for an area in which tone property is relatively important and cost-and-speed-prioritized tone correction parameters for a screen used for an area in which tone property is not so important.

Illustrative Embodiment 3

Figure 15:
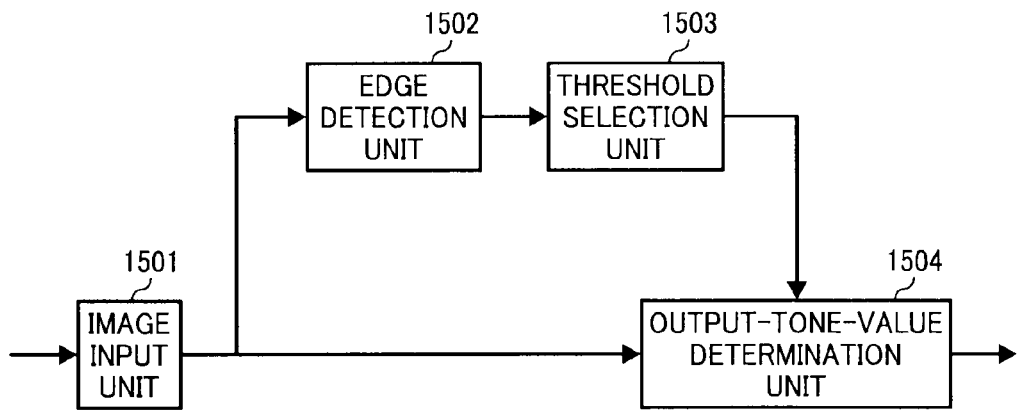
FIG. 15 is a diagram illustrating a configuration example of copying capability.

Next, an example of a configuration of copying capability using the tone correction parameters generated in the above-described manner is described with reference to FIG. 15. For example, in a color copier, image data scanned with a scanner may be converted to a plurality of images of C, M, Y, and K components through density and/or frequency correction. Such converted images are inputted to an image input unit 1501, and the image input unit 1501 serially transmits input tone values by one pixel to the following processing units.

An edge detection unit 1502 detects an edge portion in the manner described below and transmits detection results to a threshold selection unit 1503. Based on the detection results, the threshold selection unit 1503 determines thresholds in accordance with a threshold matrix for generating the higher-LPI screen illustrated in FIG. 6 when a target pixel is an edge portion or a threshold matrix for generating the lower-LPI screen illustrated in FIG. 5 when a target pixel is not an edge portion, and transmits threshold matrix information including the determined thresholds to an output-tone-value determination unit 1504.

The output-tone-value determination unit 1504 compares the determined thresholds included in the threshold matrix information with the input tone values to determine output tone values.

Figure 16:
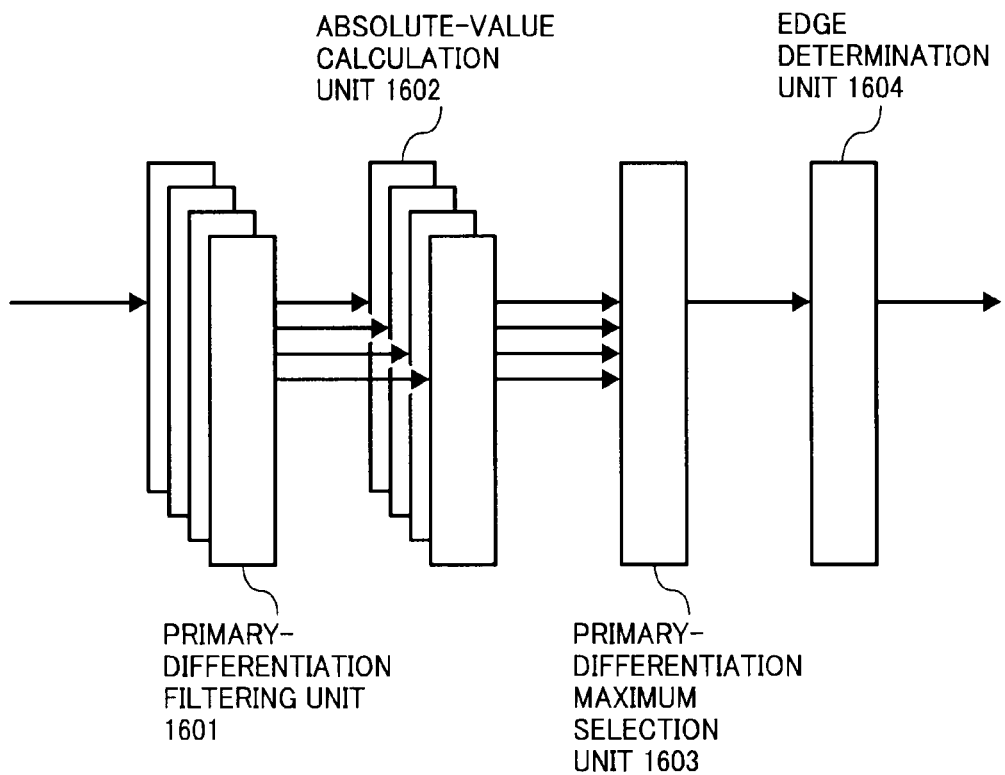
FIG. 16 is a diagram illustrating a configuration of an edge detection unit.

Next, the edge detection unit 1502 is described with reference to FIG. 16. FIG. 16 is a diagram illustrating a configuration of the edge detection unit 1502 with reference to FIG. 16. A primary differentiation filtering unit 1601 performs primary differentiation filtering computation on an image inputted from the image input unit 1501 illustrated in FIG. 15. To detect inclination in four directions, i.e., vertical, horizontal, left-and-right oblique directions, product-sum operation is performed on each of the input tone values using filters 1701 to 1704 illustrated in FIG. 17 in which the target pixel is at the center of each filter. Thus, the primary differentiation filtering unit 1601 obtains four types of primary differentiation values and transmits the values to an absolute-value calculation unit 1602. The absolute-value calculation unit 1602 calculates absolute values of the primary differentiation values and transmits the absolute values to a primary differentiation maximum selection unit 1603. The primary differentiation maximum selection unit 1603 sends a maximum value of the absolute values as the maximum primary-differentiation value of the target value to an edge determination unit 1604.

If the maximum primary-differentiation value received from the primary differentiation maximum selection unit 1603 is not less than the primary differentiation threshold, the edge determination unit 1604 determines that the target pixel is an edge portion. Otherwise, the edge determination unit 1604 determines that the target pixel is not an edge portion.

Thus, the configuration according to the present illustrative embodiment allows creating high-resolution tone correction parameters for a screen used for an area in which tone property is relatively important and cost-and-speed-prioritized tone correction parameters for a screen used for an area in which tone property is not so important.

Further, in another illustrative embodiment of the present disclosure, a storage medium storing program codes of a software to implement at least one of the above-described capabilities may be provided with a system or apparatus so that at least one of the above-described capabilities is carried out by a computer, e.g., a CPU (central processing unit) or MPU (micro processing unit) of the system or apparatus reading and executing the program codes stored in the storage medium. In such a case, the program codes read from the storage medium realize the capabilities described in the above-described illustrative embodiments. The storage medium storing such program codes is, for example, a hard disk drive, an optical disk, a magneto-optical disk, a non-volatile memory card, a ROM (read-only memory), or the like. Executing the program codes read by the computer not only directly realizes the above-described capabilities but also may cause an operating system (OS) operating in the computer to perform all or a part of actual processing in accordance with instructions of the program codes to realize the above-described capabilities. Further, after the program codes read from the storage medium are written to a memory provided at a function-expansion board inserted in the computer or a function-expansion unit connected to the computer, a CPU or another processor mounted on the function-expansion board or unit may perform all or a part of actual processing in accordance with the instructions of the program codes to realize the above-described capabilities. Alternatively, the program codes to realize the above-described capabilities may be provided using a server through communication via a network.

Numerous additional modifications and variations are possible in light of the above teachings. It is therefore to be understood that within the scope of the appended claims, the disclosure of the present invention may be practiced otherwise than as specifically described herein.

With some embodiments of the present invention having thus been described, it will be obvious that the same may be varied in many ways. Such variations are not to be regarded as a departure from the scope of the present invention, and all such modifications are intended to be included within the scope of the present invention.

For example, elements and/or features of different illustrative embodiments may be combined with each other and/or substituted for each other within the scope of this disclosure and appended claims.

What is claimed is:

1. An image processing device comprising:
    an image output unit to output a tone-correction-parameter generation sheet to generate a parameter for correcting a tone of an input image, the tone-correction-parameter generation sheet comprising a plurality of patches for at least two types of screens, at least one of the at least two types of screens including more patches of an identical color and tone than at least another of the at least two types of screens;
    an image input unit to input a representative value of each patch read from the tone-correction-parameter generation sheet outputted by the image output unit; and
    a tone-correction-parameter generation unit to generate the parameter in accordance with the representative value inputted by the image input unit.

2. The image processing device according to claim 1, wherein one type of screen having a lowest number of lines per inch of the at least two types of screens includes more patches than at least another type of screen of the at least two types of screens.

3. The image processing device according to claim 1, wherein one type of screen for a picture-and-pattern portion or a non-edge portion of the at least two types of screens includes more patches than at least another type of screen of the at least two types of screens.

4. The image processing device according to claim 1, wherein one type of screen for a character portion or an edge portion of the at least two types of screens includes more patches than at least another type of screen of the at least two types of screens.

5. An apparatus, comprising:
    a processor;
    an image output unit that outputs a tone-correction-parameter generation sheet including a plurality of patches for at least two types of screens, at least one of the at least two types of screens including more patches of an identical color and tone than at least another of the at least two types of screens,
    wherein the processor generates a parameter to correct a tone of an input image based on the tone-correction-parameter generation sheet.

6. The apparatus according to claim 5, wherein one type of screen having a lowest number of lines per inch of the at least two types of screens includes more patches than at least another type of screen of the at least two types of screens.

7. The apparatus according to claim 5, wherein one type of screen for a picture-and-pattern portion or a non-edge portion of the at least two types of screens includes more patches than at least another type of screen of the at least two types of screens.

8. The apparatus according to claim 5, wherein one type of screen for a character portion or an edge portion of the at least two types of screens includes more patches than at least another type of screen of the at least two types of screens.

9. An image processing method, comprising:
    outputting a tone-correction-parameter generation sheet to generate a parameter for correcting a tone of an input image, the tone-correction-parameter generation sheet comprising a plurality of patches for at least two types of screens, at least one of the at least two types of screens including more patches of an identical color and tone than at least another of the at least two types of screens;
    inputting a representative value of each patch read from the tone-correction-parameter generation sheet outputted by the outputting; and
    generating the parameter in accordance with the representative value inputted by the inputting.

10. A non-transitory computer-readable storage medium storing program codes causing a computer to execute the image processing method according to claim 9.

* * * * *